US007809971B2

(12) United States Patent
Shimobeppu

(10) Patent No.: US 7,809,971 B2
(45) Date of Patent: Oct. 5, 2010

(54) CLOCK DISTRIBUTION CIRCUIT, SEMICONDUCTOR INTEGRATED CIRCUIT AND METHOD OF DESIGNING CLOCK DISTRIBUTION CIRCUIT

(75) Inventor: Masayuki Shimobeppu, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 605 days.

(21) Appl. No.: 11/760,889

(22) Filed: Jun. 11, 2007

(65) Prior Publication Data
US 2007/0286323 A1 Dec. 13, 2007

(30) Foreign Application Priority Data
Jun. 12, 2006 (JP) ............................. 2006-162766

(51) Int. Cl.
G06F 17/50 (2006.01)
H03L 7/06 (2006.01)
(52) U.S. Cl. ..................... 713/400; 713/401; 713/7; 713/8; 331/17; 331/25; 327/156; 327/157
(58) Field of Classification Search ............... 713/400, 713/401; 331/17, 25; 327/156, 157; 716/7, 716/8
See application file for complete search history.

(56) References Cited
U.S. PATENT DOCUMENTS
6,201,448 B1 * 3/2001 Tam et al. ..................... 331/25

| 6,211,740 | B1 * | 4/2001 | Dai et al. | 331/2 |
| 6,624,681 | B1 * | 9/2003 | Loyer et al. | 327/297 |
| 7,005,907 | B2 * | 2/2006 | Ibuka | 327/295 |
| 2002/0140487 | A1 * | 10/2002 | Fayneh et al. | 327/295 |

FOREIGN PATENT DOCUMENTS
JP 2004-15032 A 1/2004
JP 2004-241699 A 8/2004

* cited by examiner

Primary Examiner—Abdelmoniem Elamin
(74) Attorney, Agent, or Firm—Sughrue Mion, PLLC

(57) ABSTRACT

A clock distribution circuit, which is provided in IC that has a first sequential circuit receiving first clock through a first branch node on a first clock network, a second sequential circuit receiving second clock through a second branch node on a second clock network, and a data transfer path between the first and second sequential circuits, includes: a first PLL receiving a first feedback clock that is the first clock branched at the first branch node and outputting the first clock to the first clock network based on the first feedback clock; and a second PLL receiving a second feedback clock that is the second clock branched at the second branch node and outputting the second clock to the second clock network based on the second feedback clock. A branch node is provided at least one of between the first PLL and the first branch node and between the second PLL and the second branch node.

9 Claims, 8 Drawing Sheets

CLOCK DISTRIBUTION CIRCUIT, SEMICONDUCTOR INTEGRATED CIRCUIT AND METHOD OF DESIGNING CLOCK DISTRIBUTION CIRCUIT

BACKGROUND OF THE INVENTION

1. Field of the Invention

The present invention relates to a clock distribution circuit, a semiconductor integrated circuit, a method and a program for designing a clock distribution circuit.

2. Description of Related Art

A semiconductor integrated circuit (LSI) is provided with a clock distribution circuit that receives a clock from the outside and supplies the clock to a circuit requiring the clock in the semiconductor integrated circuit. The clock distribution circuit includes clock distribution interconnections and clock distribution buffers, and is configured such that clock distribution delay times from a clock supply source (clock source) to respective clock supply destinations (leafs) become uniform. A clock tree synthesis (CTS) method is used as a method for designing such the clock distribution circuit. The clock tree synthesis method has the following feature. That is, based on circuit connection information, placement information and so on, the clock from the clock source is branched into a plurality of clock lines and a clock skew is reduced by inserting buffers (also called "CTS buffers") such that the clock delays from the clock source to respective tree end points as the branch destinations become uniform.

Japanese Laid-Open Patent Application JP-P2004-241699 discloses an example of a method of designing a clock distribution circuit by using the above-mentioned CTS method. A delay ratio between a delay of a gate of a clock distribution buffer on a clock tree and a delay of a clock distribution interconnection is calculated, and the delay ratio and a delay time are made uniform between respective clock lines, thereby reducing fluctuation in response to change in temperature or voltage.

Also, Japanese Laid-Open Patent Application JP-P2004-15032 discloses an equivalent circuit of a clock distribution circuit, which is shown in FIG. 1. In FIG. 1, a clock input buffer 2 supplies an external clock signal to a plurality of PLL circuits 1. Each PLL circuit 1 outputs the clock signal to a clock tree including a clock interconnection 5 and a clock driver 6. The clock tree distributes and supplies the clock signal to a plurality of macros 3. Each macro 3 includes an intra-macro F/F 12. A feedback circuit consisting of an interconnection 11 and an input buffer delay compensation circuit 8 is formed between an interface macro feedback clock output terminal 10 of the macro 3 and a PLL feedback clock input terminal 13 of the PLL circuit 1. That is to say, the PLL circuit 1 modulates the phase of the clock signal fed back from the macro 3 on the basis of the external clock signal and outputs to the clock tree.

The inventor of the present application has recognized the following points.

As shown in FIG. 1, the clock distribution circuit has the plurality of PLL circuits 1, and a clock tree or a clock distribution network is constructed with respect to each PLL circuit 1. The clock is fed back from the macro 3 that is the end point of the clock tree or the clock distribution network to the corresponding PLL circuit 1. However, the feedback circuit to the PLL circuit 1 is formed with disregard to a data transfer path connecting between sequential circuits that belong to different clock trees (clock domains) respective of which PLL circuits 1 as the clock supply sources are different from each other. In the present specification, the data transfer path, which connects between sequential circuits belonging to different clock trees (clock domains) respective of which PLL circuits as the clock supply sources are different from each other, is referred to as an "inter-clock-domain data transfer path" or an "inter-domain data transfer path". For example, in the lower part of FIG. 1, the interconnection 11a and the input buffer delay compensation circuit 8a are formed as the feedback circuit to the PLL circuit 1a and also the interconnection 11b and the input buffer delay compensation circuit 8b are formed as the feedback circuit to the PLL circuit 1b, with disregard to whether or not an inter-clock-domain data transfer path connecting between the macro 3a and the macro 3b belonging to different clock trees is present.

In this case, in the clock distribution circuit shown in FIG. 1, the clock is distributed from the PLL circuit 1a to the macros 3 and 3a with the same delay, and the PLL circuit 1a adjust the phase of the output clock such that the phase of the clock (reference clock) input from the outside of the LSI to the PLL circuit 1a through the clock input buffer 2 is synchronized with the phase of the clock (feedback clock) fed back from the feedback clock output terminal 10 of the macro 3a to the PLL circuit 1a through the input buffer delay compensation circuit 8. The same applies to the PLL circuit 1b. Since the clocks are fed back from respective macros 3a and 3c as representative points to respective PLL circuits 1a and 1b, the clocks in phase and with no skew are input as the input clocks to respective macros 3a and 3c. If the clock is distributed from the PLL circuit 1a to the macros 3 and 3a with the same delay, it eventually results in the clock distribution circuit in which the phases of the input clocks of the macros 3, 3a, 3b and 3c are synchronized with the phase of the clock input to the clock input buffer 2.

Here, let us consider a case where a data transfer path exists between the macro 3a and the macro 3b. In an actual semiconductor integrated circuit, an OCV (On Chip Variation) such as variations of devices and interconnections in a chip occurs, even if circuits are so designed as to have the same circuit characteristics. Therefore, there is a possibility that the delay to the macro 3c and the delay to the macro 3b become different from each other due to influence of the OCV. This cannot be avoided even by the use of the technique described in the former patent document (Japanese Laid-Open Patent Application JP-P2004-241699). In the configuration of the clock distribution circuit shown in FIG. 1, the clock output from the PLL circuit 1b passes through the buffer 6, and is distributed to respective macros 3c and 3b via a branch node at the output of the buffer 6. According to such the circuit, the delay from the branch node to the macro 3c and the delay from the branch node to the macro 3b may become different from each other (clock skew occurs) due to the influence of the OCV. In this case, the phase of the clock signal of the macro 3a deviates from the phase of the clock signal of the macro 3b, and thus the timing of data transfer between the macro 3a and the macro 3b may become out of synchronization. As a result, the data transfer between the macro 3a and the macro 3b may possibly fail, which causes malfunction. A technique is desired that can distribute the clock signal without influenced by the OCV even in the case where the data transfer path (inter-domain data transfer path) which connects between circuits belonging to different clock trees (clock domains) exists.

SUMMARY

In one embodiment of the present invention, a clock distribution circuit in a semiconductor integrated circuit is provided. The semiconductor integrated circuit has: a first sequential circuit which operates in accordance with a first clock signal distributed through a first branch node on a first clock distribution network; a second sequential circuit which operates in accordance with a second clock signal distributed through a second branch node on a second clock distribution network; and a data transfer path provided between the first sequential circuit and the second sequential circuit. The clock distribution circuit has a first PLL circuit and a second PLL circuit. The first PLL circuit receives a first feedback clock signal that is the first clock signal branched at the first branch node, and outputs the first clock signal to the first clock distribution network based on the first feedback clock signal and a first reference clock signal. The second PLL circuit receives a second feedback clock signal that is the second clock signal branched at the second branch node, and outputs the second clock signal to the second clock distribution network based on the second feedback clock signal and a second reference clock signal. A branch node is provided at least one of between an output of the first PLL circuit and the first branch node on the first clock distribution network and between an output of the second PLL circuit and the second branch node on the second clock distribution network.

In the circuit thus configured, the first feedback clock signal is fed back from the first branch node, and the second feedback clock signal is fed back from the second branch node. Here, the first branch node is between the first PLL circuit and the first sequential circuit. The second branch node is between the second PLL circuit and the second sequential circuit. That is to say, the first feedback clock signal reflects a delay of the first clock signal at the first sequential circuit. The second feedback clock signal reflects a delay of the second clock signal at the second sequential circuit. It is therefore possible to make the delay of the first clock signal to the first sequential circuit and the delay of the second clock signal to the second sequential circuit substantially equal to each other without being influenced by the OCV, and thus to suppress difference in the phase between the first clock signal and the second clock signal. Consequently, it is possible to properly perform the data transfer between the first sequential circuit and the second sequential circuit.

It is possible to distribute the clock signal without influenced by the OCV, even in the case where the data transfer path which connects between circuits belonging to different clock trees (clock domains) exists.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, a clock distribution circuit, a semiconductor integrated circuit, a method and a program for forming a clock distribution circuit according to the embodiments will be described with reference to the attached drawings.

First Embodiment

Figure 1:
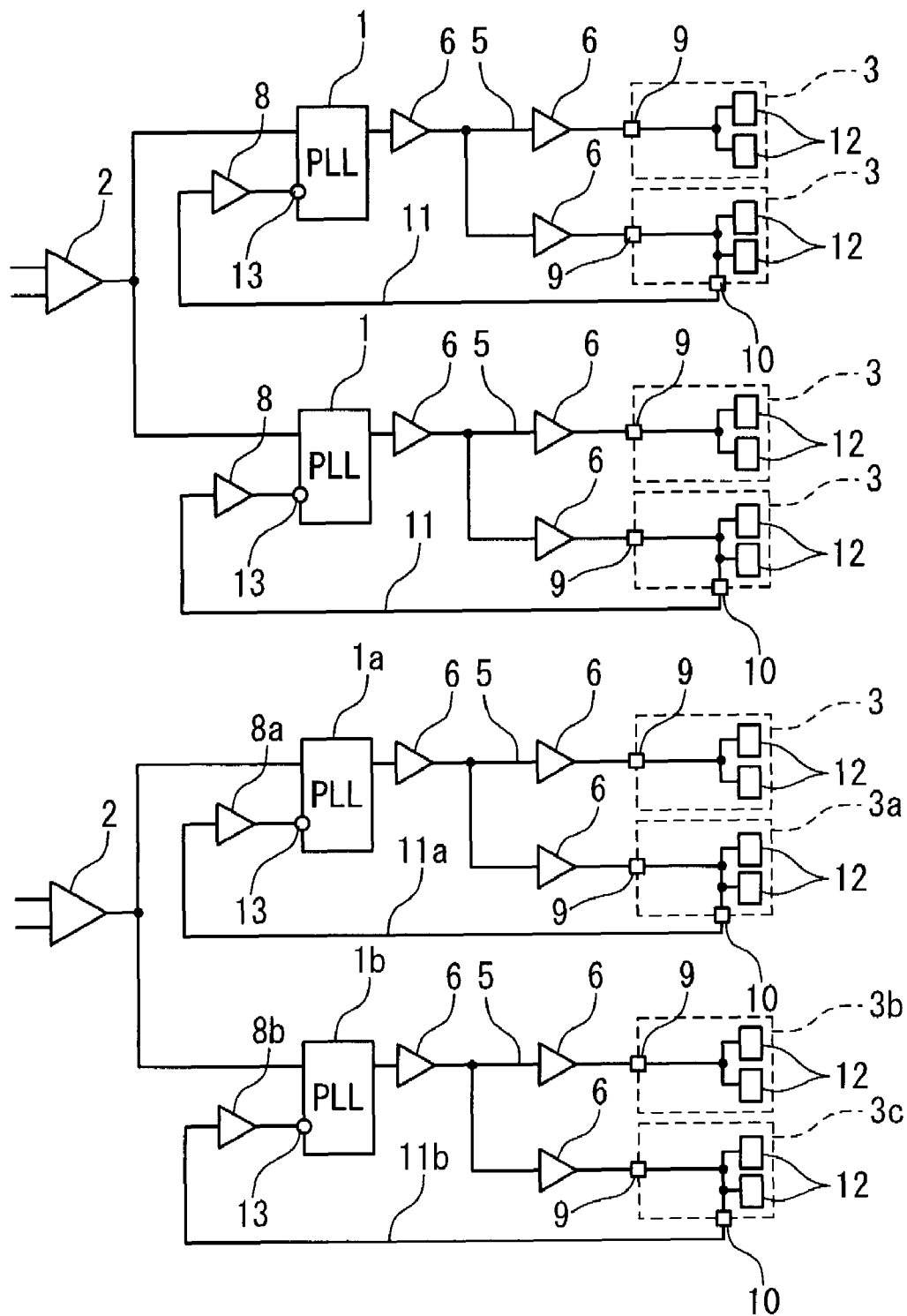
FIG. 1 is a diagram showing an equivalent circuit of an integrated circuit device according to a conventional technique.
Figure 2:
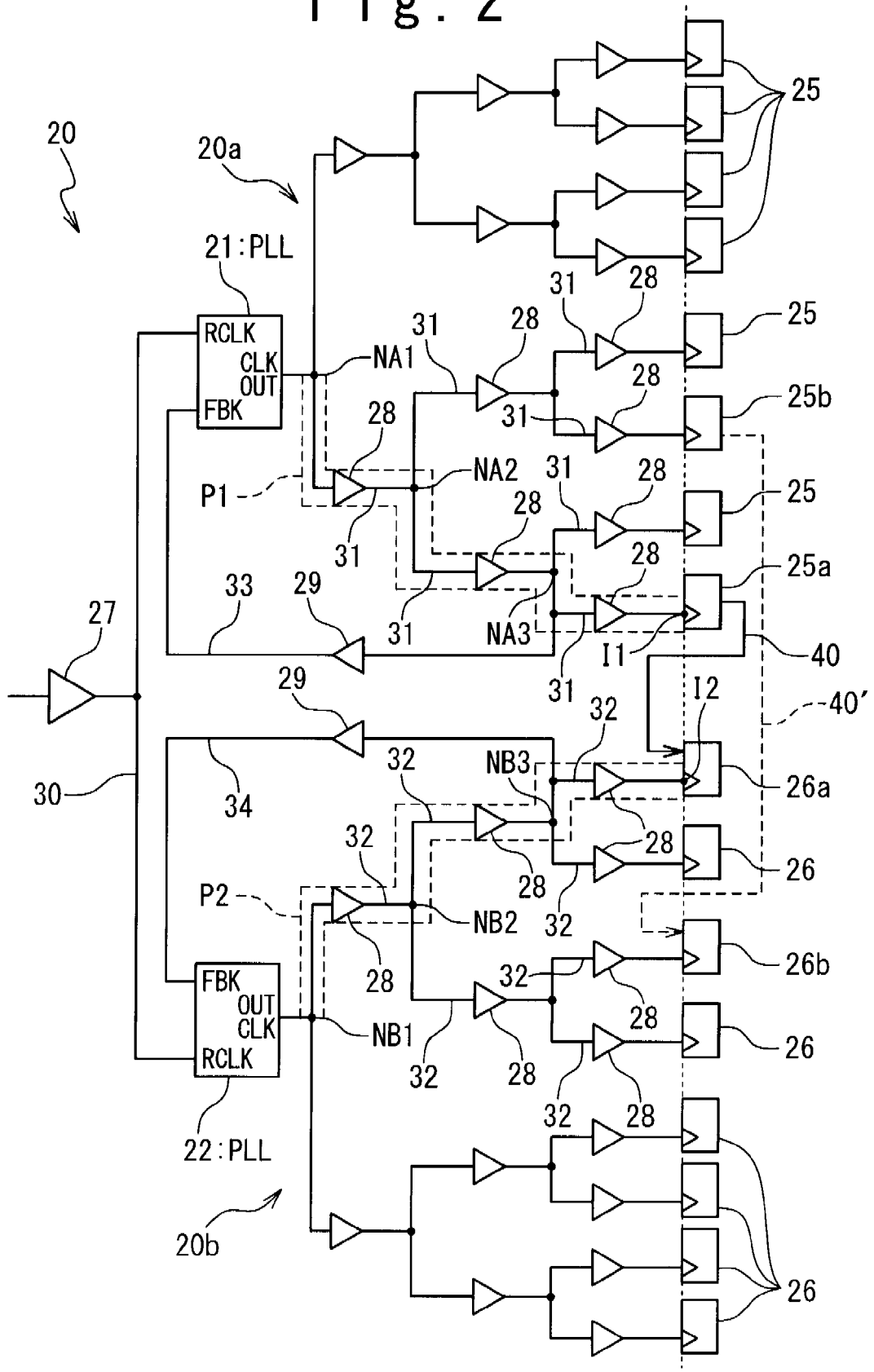
FIG. 2 is an equivalent circuit diagram showing a configuration of a clock distribution circuit according to an embodiment of the present invention.

First, a clock distribution circuit according to the embodiment will be described. FIG. 2 is an equivalent circuit diagram showing a configuration of the clock distribution circuit according to the embodiment. The clock distribution circuit 20 is provided in a semiconductor integrated circuit (45: described later) and distributes a clock signal, which is generated by using frequency and phase of an external clock signal as a reference signal, to a plurality of sequential circuits 25, 25a, 25b, 26, 26a and 26b. Here, the sequential circuit 25a and the sequential circuit 26a are connected to each other through a data transfer path 40. That is, the data transfer path 40 is the "inter-domain data transfer path". The clock distribution circuit 20 includes a clock distribution network 20a, a PLL circuit 21, a clock distribution network 20b, a PLL circuit 22, a clock driver 27 and an interconnection 30. In the present embodiment, a reference clock input from the outside is supplied from the clock driver 27 to the PLL circuits 21 and 22 with the same delay time.

The PLL circuit 21 modulates frequency and phase of a first feedback clock signal such that the first feedback clock signal is in synchronization with a first reference clock signal, and outputs the modulated signal as a first clock signal to the clock distribution network 20a. Here, the first reference clock signal is an external clock signal which is supplied to a reference clock terminal RCLK of the PLL circuit 21 from the outside through the clock driver 27 and the interconnection 30. The first feedback clock signal is the first clock signal which is supplied to a feedback clock terminal FBK of the PLL circuit 21 from a first feedback branch node through a clock driver 29 and an interconnection 33. In FIG. 2, the first feedback branch node is exemplified by a branch node NA3. A method of determining the branch node NA3 will be described later.

The clock distribution network 20a distributes the first clock signal output from a clock output terminal CLKOUT of the PLL circuit 21 to the plurality of sequential circuits 25, 25a and 25b. The clock distribution network 20a includes an interconnection 31 constituting a clock tree and a plurality of clock drivers 28 provided on the interconnection 31. There are a plurality of branch nodes (NA1, NA2, NA3, . . . in this order from the side of the PLL circuit 21) on the interconnection 31. Shown in FIG. 2 is a case where there are three branch nodes (the branch node NA1, the branch node NA2 and the branch node NA3).

Here, the above-mentioned first feedback branch node is set at a position on a path P1 from a branch node on the subsequent stage of the first-appearing branch node NA1 (namely, not including the first-appearing branch node NA1 and closer to the leaf) in the clock tree (interconnection 31) of the clock distribution network 20a on the side of the PLL circuit 21 to a clock input terminal I1 of the sequential circuit 25a. The reason will be described later. A delay of a path (including the interconnection 31 and the clock driver 28) from the first feedback branch node to the clock input terminal I1 of the sequential circuit 25a is a Delay-A1. A delay of a path (including the interconnection 33 and the clock driver 29) from the first feedback branch node to the feedback clock terminal FBK of the PLL circuit 21 is a Delay-B1. In this case, the above-mentioned position of the first feedback branch node is selected such that delay difference between the Delay-A1 and the Delay-B1 becomes within a predetermined allowable range, and preferably the delay difference becomes 0. As mentioned above, the first feedback branch node in FIG. 2 is the branch node NA3 on the path P1.

The first feedback branch node is set on the path P1 from the branch node NA1 (not including the first-appearing branch node NA1 itself) to the clock input terminal I1. It should be noted that the first feedback branch node is preferably close to the sequential circuits 25, 25a, 25b (leafs) as possible. If the first feedback branch node is provided away from the leaf, the delay from the first feedback branch node to the leaf becomes large. In this case, the influence of the OCV becomes large, which causes deterioration of timing between the sequential circuits (especially, between the sequential circuit 25a and the sequential circuit 26a). It is therefore preferable, for example, that the first feedback branch node is set to a branch node (NA3) among the branch nodes on the path P1 from the PLL circuit 21 to the sequential circuit 25a, by which the delay of the first clock signal from the branch node to the sequential circuit 25a is equal to the delay of the first clock signal from the branch node to the PLL circuit 21 and the branch node is closest to the sequential circuit 25a.

Consequently, the first clock signal, which is distributed from the PLL circuit 21 to the branch node NA3 on the same clock distribution path, is further distributed to the clock input terminal I1 of the sequential circuit 25a connected to the data transfer path 40 and also to the feedback clock terminal FBK of the PLL circuit 21 as the first feedback clock signal such that distribution delays from the branch node NA3 become substantially equal to each other. Therefore, the frequency and the phase of the first clock signal at the feedback clock terminal FBK of the PLL circuit 21 are substantially equal to those of the first clock signal at the clock input terminal I1 of the sequential circuit 25a, respectively.

The PLL circuit 22 modulates frequency and phase of a second feedback clock signal such that the second feedback clock signal is in synchronization with a second reference clock signal, and outputs the modulated signal as a second clock signal to the clock distribution network 20b. Here, the second reference clock signal is an external clock signal which is supplied to a reference clock terminal RCLK of the PLL circuit 22 from the outside through the clock driver 27 and the interconnection 30. In FIG. 2, the second reference clock signal is the same as the first reference clock signal. The second feedback clock signal is the second clock signal which is supplied to a feedback clock terminal FBK of the PLL circuit 22 from a second feedback branch node through a clock driver 29 and an interconnection 34. In FIG. 2, the second feedback branch node is exemplified by a branch node NB3. A method of determining the branch node NB3 will be described later.

The clock distribution network 20b distributes the second clock signal output from a clock output terminal CLKOUT of the PLL circuit 22 to the plurality of sequential circuits 26, 26a and 26b. The clock distribution network 20b includes an interconnection 32 constituting a clock tree and a plurality of clock drivers 28 provided on the interconnection 32. There are a plurality of branch nodes (NB1, NB2, NB3, . . . in this order from the side of the PLL circuit 22) on the interconnection 32. Shown in FIG. 2 is a case where there are three branch nodes (the branch node NB1, the branch node NB2 and the branch node NB3).

Here, the above-mentioned second feedback branch node is set at a position on a path P2 from a branch node on the subsequent stage of the first-appearing branch node NB1 (namely, not including the first-appearing branch node NB1 and closer to the leaf) in the clock tree (interconnection 32) of the clock distribution network 20b on the side of the PLL circuit 22 to a clock input terminal I2 of the sequential circuit 26a. The reason will be described later. A delay of a path (including the interconnection 32 and the clock driver 28) from the second feedback branch node to the clock input terminal I2 of the sequential circuit 26a is a Delay-A2. A delay of a path (including the interconnection 34 and the clock driver 29) from the second feedback branch node to the feedback clock terminal FBK of the PLL circuit 22 is a Delay-B2. In this case, the above-mentioned position of the second feedback branch node is selected such that delay difference between the Delay-A2 and the Delay-B2 becomes within a predetermined allowable range, and preferably the delay difference becomes 0. As mentioned above, the second feedback branch node in FIG. 2 is the branch node NB3 on the path P2.

The second feedback branch node is set on the path P2 from the branch node NB1 (not including the first-appearing branch node NB1 itself) to the clock input terminal I2. It should be noted that the second feedback branch node is preferably close to the sequential circuits 26, 26a, 26b (leafs) as possible. If the second feedback branch node is provided away from the leaf, the delay from the second feedback branch node to the leaf becomes large. In this case, the influence of the OCV becomes large, which causes deterioration of timing between the sequential circuits (especially, between the sequential circuit 25a and the sequential circuit 26a). It is therefore preferable, for example, that the second feedback branch node is set to a branch node (NB3) among the branch nodes on the path P2 from the PLL circuit 22 to the sequential circuit 26a, by which the delay of the second clock signal from the branch node to the sequential circuit 26a is equal to the delay of the second clock signal from the branch node to the PLL circuit 22 and the branch node is closest to the sequential circuit 26a.

Consequently, the second clock signal, which is distributed from the PLL circuit 22 to the branch node NB3 on the same clock distribution path, is further distributed to the clock input terminal I2 of the sequential circuit 26a connected to the data transfer path 40 and also to the feedback clock terminal FBK of the PLL circuit 22 as the second feedback clock signal such that distribution delays from the branch node NB3 become substantially equal to each other. Therefore, the frequency and the phase of the second clock signal at the feedback clock terminal FBK of the PLL circuit 22 are substantially equal to those of the second clock signal at the clock input terminal I2 of the sequential circuit 26a, respectively.

The sequential circuit 25a of the sequential circuits 25, 25a and 25b connected to the clock distribution network 20a and the sequential circuit 26a of the sequential circuits 26, 26a and 26b connected to the clock distribution network 20b are connected with each other by the data transfer path 40. That is to say, data is transferred between the sequential circuit 25a and the sequential circuit 26a, and it is therefore necessary that the phases of the clock signals supplied to the respective sequential circuits are the same and in synchronization with each other. For this reason, the first feedback branch node in the clock distribution network 20a is set at a position on the path P1 from the branch node NA1 (not including NA1) to the clock input terminal I1, and the second feedback branch node in the clock distribution network 20b is set at a position on the path P2 from the branch node NB1 (not including NB1) to the clock input terminal I2. The PLL circuit 21 outputs the first clock signal such that the phase difference between the first feedback clock signal, which is the first clock signal having substantially the same frequency and phase as those of the first clock signal at the clock input terminal I1 of the sequential circuit 25a, and the reference clock signal becomes 0 at a phase comparator (not shown) of the PLL circuit 21 to which the first feedback clock signal and the reference clock signal are input. Similarly, the PLL circuit 22 outputs the second clock signal such that the phase difference between the second feedback clock signal, which is the second clock signal having substantially the same frequency and phase as those of the second clock signal at the clock input terminal I2 of the sequential circuit 26a, and the reference clock signal becomes 0 at a phase comparator (not shown) of the PLL circuit 22 to which the second feedback clock signal and the reference clock signal are input. Moreover, since the same reference clock signal is input to the PLL circuits 21 and 22, the phase of the first clock signal at the feedback clock terminal FBK of the PLL circuit 21 becomes equal to the phase of the second clock signal at the feedback clock terminal FBK of the PLL circuit 22. It is therefore possible to synchronize the phase of the first clock signal at the sequential circuit 25a with the phase of the second clock signal at the sequential circuit 26a. As a result, the timing of the data transfer agrees between the sequential circuit 25a and the sequential circuit 26a, and thus the data transfer can be performed correctly.

Here, let us consider the delay variation due to the OCV. In this case, the distribution delay from the clock output terminal CLKOUT of the PLL circuit 21 to the clock input terminal I1 of the sequential circuit 25a and the delay from the clock output terminal CLKOUT of the PLL circuit 21 to the feedback clock terminal FBK of the PLL circuit 21 may vary from ideal design values, for example. However, since the path from the clock output terminal CLKOUT of the PLL circuit 21 to the branch node NA3 is shared, the variation on the shared path is accurately reflected in the phase adjustment by the PLL circuit 21 and the substantive influence of the OCV on the delay is a difference between the delay from the branch node NA3 to the clock input terminal I1 of the sequential circuit 25a and the delay from the branch node NA3 to the feedback clock terminal FBK of the PLL circuit 21. As a result, the influence of the OCV can be reduced. The same applies to the clock distribution network 20b. As described above, it is possible to configure the clock distribution circuit with small clock skew which can reduce the influence of the OCV on the data transfer path 40 between the sequential circuit 25a and the sequential circuit 26a.

It should be noted that each of the sequential circuits 25a and 26a can be exemplified by a flip-flop, a register, or a circuit that outputs in synchronization with the clock. The PLL circuits 21 and 22 may be connected to the respective branch nodes NA1 and NB1 through a plurality of buffers without any branch node.

Here, let us consider a case where there is another sequential circuit performing a data transfer (there are a plurality of inter-domain data transfer paths). In a case where the sequential circuit 25b and the sequential circuit 26b perform a data transfer through a data transfer path 40' (a second inter-domain data transfer path) shown in FIG. 2, for example, the effect of the present embodiment can be obtained even if any one of the plurality of inter-domain data transfer paths is selected. However, it is more effective when the first feedback branch node and the second feedback branch node are determined in accordance with the following criteria, for example. That is, the clock is fed back from the branch node on the distribution path of the clock that is input to a sequential circuit connected to a so-called timing critical data transfer path.

Here, a data transfer rate Tc is from an active edge (a clock edge which changes an output of a sequential circuit) of the clock input to a transmission-side sequential circuit of a data transfer path to an active edge (a clock edge at which a sequential circuit takes in data) of the clock input to a reception-side sequential circuit of the data transfer path, a data propagating time from the transmission-side sequential circuit to the reception-side sequential circuit is Tpd, the setup time and the hold time of the reception-side sequential circuit are Tsetup and Thold, respectively, and the skew of the clock input to the transmission-side sequential circuit and the reception-side sequential circuit is Tskew. In this case, in order that the data transfer path satisfies a delay condition, both of the following conditions must be satisfied:

$Tc > Tpd + Tsetup + Tskew$ (setup condition);

$Tpd > Thold + Tskew$ (hold condition).

Generally, it is necessary for satisfying the setup condition to make Tskew smaller as Tc becomes smaller or Tpd becomes larger, which makes the timing design difficult. Although the values of Tsetup, Thold and Tskew are also relevant practically, they are not considered herein. Therefore, a data transfer path of which Tc is smallest and Tpd is largest is the most critical in the timing design. In the case where there are a plurality of inter-clock-domain data transfer paths, a path whose Tpd is maximum among paths whose Tc is minimum may be selected from the plurality of inter-clock-domain data transfer paths. It should be noted that in calculating the above-mentioned Tpd, the delay time may be calculated accurately after a placement-and-routing process of semiconductor integrated circuit design is completed or the delay time may be estimated after a provisional placement-and-routing process of semiconductor integrated circuit design is performed. Alternatively, an approximate delay time may be obtained. The timing critical data transfer path can be extracted by the above-described method. It is thus possible to make the extracted timing critical data transfer path less likely to be affected by the OCV.

The present invention is not limited to the above-described example where the clock signal is distributed to the sequential circuits. That is, any circuit to which the clock signal is distributed by the clock distribution circuit can be available.

Figure 3:
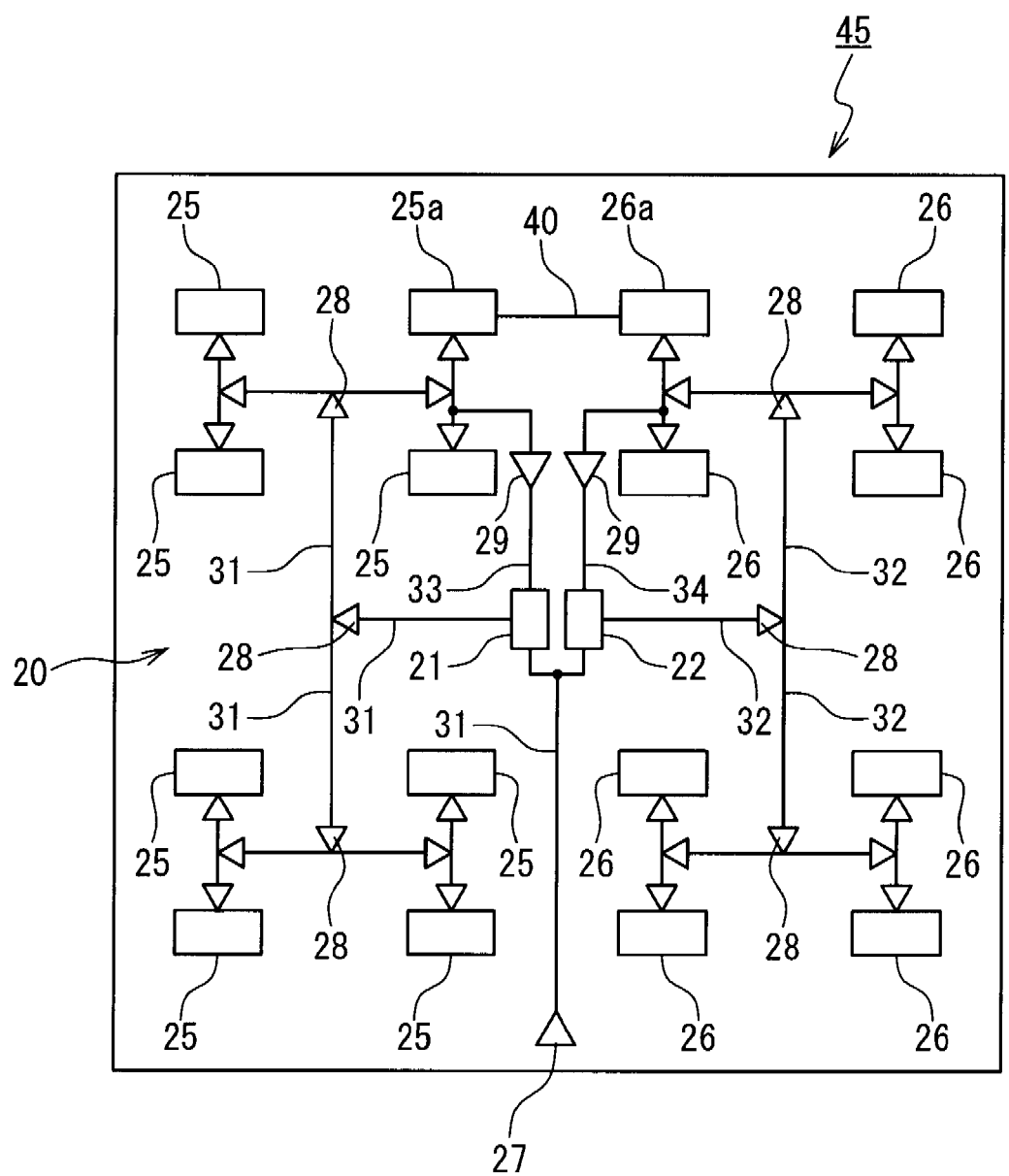
FIG. 3 is a schematic block diagram showing an example of a configuration of a semiconductor integrated circuit according to an embodiment of the present invention.

FIG. 3 is a schematic block diagram showing an example of a configuration of the semiconductor integrated circuit according to the embodiment of the present invention. Shown here is the semiconductor integrated circuit corresponding to the equivalent circuit in FIG. 2. The semiconductor integrated circuit 45 has the plurality of sequential circuits 25, 25a, 25b, 26, 26a and 26b and the clock distribution circuit 20. The clock distribution circuit 20 is provided with the PLL circuit 21, the clock distribution network 20a including the interconnections 31 and 33 and the clock drivers 28 and 29, the PLL circuit 22, the clock distribution network 20b including the interconnections 32 and 34 and the clock drivers 28 and 29, the data transfer path 40, the clock driver 27 and the interconnection 30. The interconnection 31 or 32 forms the clock tree of an H-tree type. The details of each element are as described above and description thereof is omitted.

The clock distribution networks 20a and 20b may be constructed by the CTS method to have the clock tree. The clock distribution networks 20a and 20b may be the H-tree type clock tree as shown in FIG. 3. Also, outputs of the buffers may be wired in the middle of the tree (the outputs of the buffers may be short-circuited).

Second Embodiment

The phase of the first clock signal at the clock input terminal I1 of the sequential circuit 25a and the phase of the second clock signal at the clock input terminal I2 of the sequential circuit 26a are in synchronization with the phase of the external clock signal input to the clock input buffer 27. For example, the following configuration is provided in addition to the above-described configuration of the clock distribution circuit. That is, a buffer or an interconnection or both which has a delay time corresponding to the delay time of the clock input buffer 27 (to be precise, a delay time from an external clock input terminal (not shown) to the PLL circuits 21 and 22 through the clock input buffer 27) is added to the clock path from the branch node NA3 to the feedback clock terminal FBK of the PLL circuit 21 and the clock path from the branch node NB3 to the feedback clock terminal FBK of the PLL circuit 22. The other configuration is the same as that in the first embodiment.

Third Embodiment

In the above-described first embodiment, the same reference clock signal is supplied to the PLL circuit 21 and the PLL circuit 22 (the second reference clock signal=the first reference clock signal). However, the present invention is not limited to that. The second reference clock signal and the first reference clock signal can be different reference clock signals, as long as they have a phase relationship that is known and is not changed. For example, when the frequency of one reference clock signal is constant times the frequency of the other reference clock signal, the risings of the clocks align with each other when the phases match. Such a relationship is also possible, as long as the phase relationship between the clock risings is known and is not changed.

Therefore, for example, a configuration that the clocks are supplied to the PLL circuits 21 and 22 through respective clock input buffers 27 is possible.

Moreover, the present invention can have a configuration that at least one of the PLL circuits 21 and 22 is provided with a frequency divider circuit for multiplying. A frequency divider circuit for multiplying may be provided at least one of the clock path from the branch node NA3 to the feedback clock terminal FBK of the PLL circuit 21 and the clock path from the branch node NB3 to the feedback clock terminal FBK of the PLL circuit 22.

<Place-and-route System>

Figure 4:
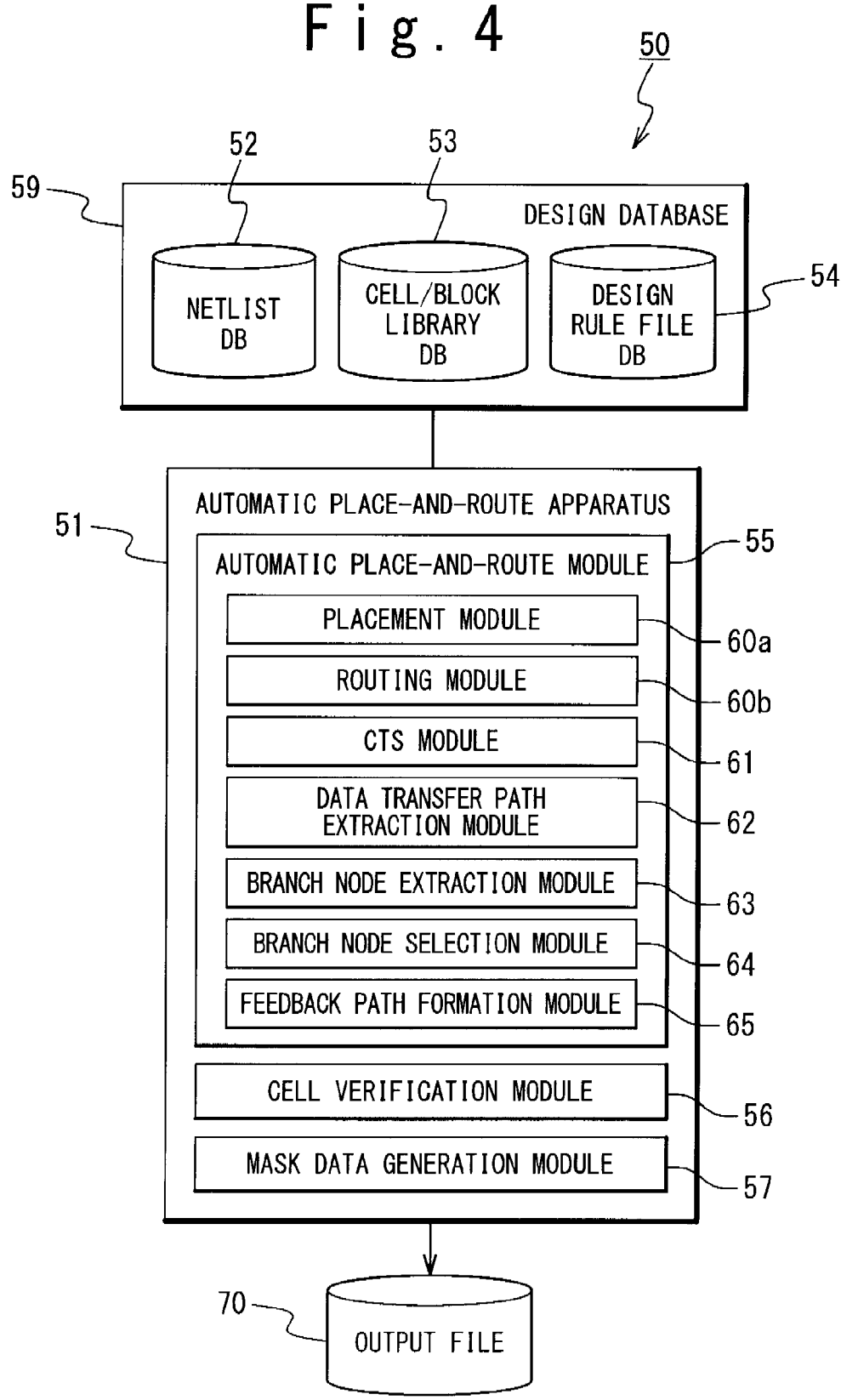
FIG. 4 is a diagram showing a configuration of a place-and-route system to which a method of forming a clock distribution circuit according to an embodiment of the present invention is applied.

Next, a configuration of a place-and-route system for semiconductor integrated circuit design to which a method of forming the clock distribution circuit according to the embodiments of the present invention is applied will be described below with reference to the attached drawings. FIG. 4 is a diagram showing a configuration of a place-and-route system to which a method of forming the clock distribution circuit according to the embodiments of the present invention is applied. The place-and-route system 50 is provided with an automatic place-and-route apparatus 51 and a design database 59.

The design database 59 includes a netlist database (DB) 52, a cell/block library database (DB) 53 and a design rule file database (DB) 54. The netlist DB 52 stores a netlist (circuit diagram data) which represents connection relationships between terminals of respective blocks constituting the semiconductor integrated circuit that is a design target. The cell/block library DB 53 stores data of logic functional cells/blocks such as a via, a NAND gate, a circuit for realizing a complicated logic function and so on. The design rule file DB 54 stores a design rule such as an interconnection pitch, an interconnection width and an interconnection minimum interval on each interconnection layer, sizes of respective components constituting the via cell and the like, which is used in placement-and-routing and verification.

The automatic place-and-route apparatus 51 is a data processing apparatus exemplified by a work station. The automatic place-and-route apparatus 51 is provided with an automatic place-and-route module 55, a cell verification module 56 and a mask data generation module 57 that are computer programs. The automatic place-and-route apparatus 51 and the design database 59 are so connected with each other as to establish communication. The design database 59 may be incorporated into the automatic place-and-route apparatus 51 in order to simplify the system and reduce space.

The automatic place-and-route module 55 generates a placement-and-routing data (layout data) on the basis of the netlist, the functional block data and the design rule data stored in the design database 59. The automatic place-and-route module 55 includes a placement module 60a, a routing module 60b, a CTS module 61, a data transfer path extraction module 62, a branch node extraction module 63, a branch node selection module 64 and a feedback path formation module 65.

The placement module 60a generates a floor plan of the semiconductor integrated circuit on the basis of the netlist, the functional block data and the design rule data stored in the design database 59. In the floor plan, regions and positions in a placement-and-routing region at which the logic functional cells/blocks are placed are set. Then, the placement module 60a places the logic functional cells/blocks in the placement-and-routing region based on the floor plan. Power routing can be performed either before or after the placement of the logic functional cells/blocks. At this time, the sequential circuits 25, 25a and 25b configured to operate in accordance with the first clock signal, the sequential circuits 26, 26a and 26b configured to operate in accordance with the second clock signal, the PLL circuit 21 and the PLL circuit 22 are placed.

The CTS module 61 executes the Clock Tree Synthesis (CTS) to form the clock distribution network 20a for distributing the first clock signal output from the PLL circuit 21 to the sequential circuits 25, 25a and 25b and the second clock distribution network 20b for distributing the second clock signal output from the PLL circuit 22 to the sequential circuits 26, 26a and 26b.

The data transfer path extraction module 62 extracts a data transfer path between different clock distribution networks (inter-clock-domain data transfer path). The data transfer path extraction module 62 may extract arbitrary one. Preferably, the data transfer path extraction module 62 executes routing with respect to the extracted path, performs timing analysis, and extracts the above-mentioned timing critical data transfer path (with small margin). Alternatively, an accurate STA (Static Timing Analysis) may be performed and a path having the smallest timing margin is extracted.

The branch node extraction module 63 extracts the clock input terminal of each of the transmission-side sequential circuit and the reception-side sequential circuit that are respectively connected to both ends of the extracted data transfer path. Then, the branch node extraction module 63 extracts a path from the extracted clock input terminal of the sequential circuit to the PLL circuit of the clock distribution network, and extracts a plurality of clock branch nodes on the extracted path.

The branch node selection module 64 selects one clock branch node from the extracted clock branch nodes. Here, a delay from the clock input terminal of the sequential circuit to a clock branch node is defined as Delay-A, while a delay from the feedback clock terminal FBK of the PLL circuit to a clock branch node is defined as Delay-B. The branch node selection module 64 selects the one clock branch node closest to the sequential circuit (closest to the leaf) among clock branch nodes with which the Delay-A becomes equal to or larger than the Delay-B.

For example, the branch node selection module 64 may first search the plurality of clock branch nodes extracted by the branch node extraction module 63 for clock branch nodes with which the Delay-A is equal to or larger than the Delay-B. Then, the branch node selection module 64 may select a clock branch node closest to the sequential circuit (closest to the leaf) from the clock branch nodes with which the Delay-A is equal to or larger than the Delay-B.

Alternatively, the branch node selection module 64 may first select a clock branch node closest to the sequential circuit (closest to the leaf) among the plurality of clock branch nodes extracted by the branch node extraction module 63. Subsequently, based on the selected clock branch node, the branch node selection module 64 calculates the Delay-A from the clock input terminal of the sequential circuit to the clock branch node and the Delay-B from the feedback clock terminal FBK of the PLL circuit to the clock branch node, and compares the Delay-A with the Delay-B. If the Delay-A is less than the Delay-B, the branch node selection module 64 selects the next closest clock branch node to the sequential circuit among the extracted plurality of clock branch nodes, and calculates the Delay-A and the Delay-B again. Thus, a clock branch node with which the Delay-A is equal to or mother than the Delay-B can be retrieved.

The feedback path formation module 65 sets the clock branch node selected by the branch node selection module 64 as the feedback branch node. Then, the feedback path formation module 65 forms a feedback path between the feedback branch node and the feedback clock terminal FBK of the PLL circuit such that the Delay-A becomes equal to the Delay-B. Here, the feedback path may be a mere interconnection or may further include a plurality of buffers (inserted) if required.

The routing module 60b performs routing between the logic functional cells/blocks in the placement-and-routing region on the basis of the netlist, the functional block data and the design rule data stored in the design database 59, to generate the placement-and-routing data after layout. The place-and-route module 60 may perform shield routing according to need.

The cell verification module 56 verifies layout, timing and signal integrity of the generated placement-and-routing data. When a problem is found in the placement-and-routing data by the verification, the automatic place-and-route module 55 executes the above-described placement-and-routing again. When no problem is found, the placement-and-routing data is output.

The mask data generation module 57 generates a mask data on the basis of the placement-and-routing data and outputs the mask data as an output file 70.

Figure 5:
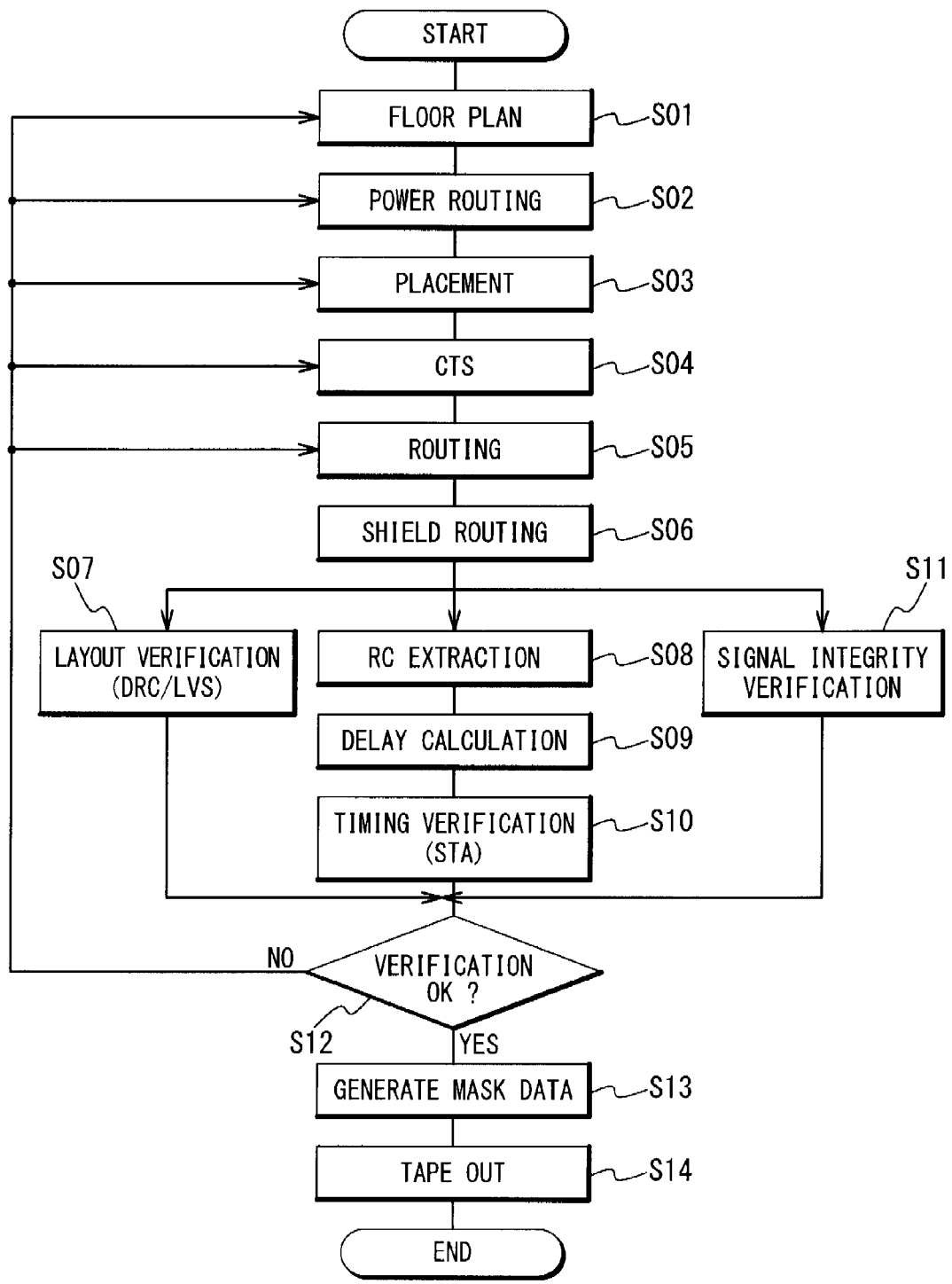
FIG. 5 is a flow chart showing a method of designing a semiconductor integrated circuit to which a method of forming a clock distribution circuit according to an embodiment of the present invention is applied.

Next, a method of forming the clock distribution circuit (an operation of the place-and-route system) according to the embodiments of the present invention will be described with reference to the attached drawings. FIG. 5 is a flow chart showing a method of designing a semiconductor integrated circuit to which the method of forming the clock distribution circuit according to the embodiments of the present invention is applied.

First, the place-and-route module 60 of the automatic place-and-route module 55 forms the floor plan of the semiconductor integrated circuit on the basis of the netlist, the functional block data and the design rule data of the design database 59 (Step S01). Next, based on the floor plan, the place-and-route module 60 performs power routing in the placement-and-routing region (Step S02). After that, based on the floor plan, the place-and-route module 60 performs placement of logic functional cells/blocks including the sequential circuits 25, 25a, 25b, 26, 26a and 26b and the PLL circuits 21 and 22 in the placement-and-routing region (Step S03). The CTS module 61, the data transfer path extraction module 62, the branch node extraction module 63, the branch node selection module 64 and the feedback path formation module 65 executes the Clock Tree Synthesis and forms the clock distribution circuit 20 including the PLL circuits 21 and 22 (see FIG. 2) (Step S04). Next, the place-and-route module 60 performs routing and shield routing to generate the placement-and-routing data after layout (Step S05, Step S06).

The cell verification module 56 performs the verification of the placement-and-routing data. The verification includes layout verification (DRC: Design Rule Checking/LVS: Layout Versus Schematic) (Step S07), RC (parasitic resistance and parasitic capacitance) extraction (Step S08), delay calculation (Step S09), timing verification (STA: Static Timing Analysis) (Step S10) and signal integrity verification (Step S11). If a problem is found in the placement-and-routing data by the verification (Step S12; NO), the automatic place-and-route module 55 performs the placement-and-routing again, depending on the state of the problem (Step S01 to Step S06). When no problem is found (Step S12; YES), the cell verification module 56 outputs the placement-and-routing data. The mask data generation module 57 generates the mask data on the basis of the placement-and-routing data (Step S13), and outputs the mask data as the output file 70 (Step S14).

In this manner, the method of designing the semiconductor integrated circuit to which the method of forming the clock distribution circuit according to the embodiments of the present invention is applied is performed.

Figure 6:
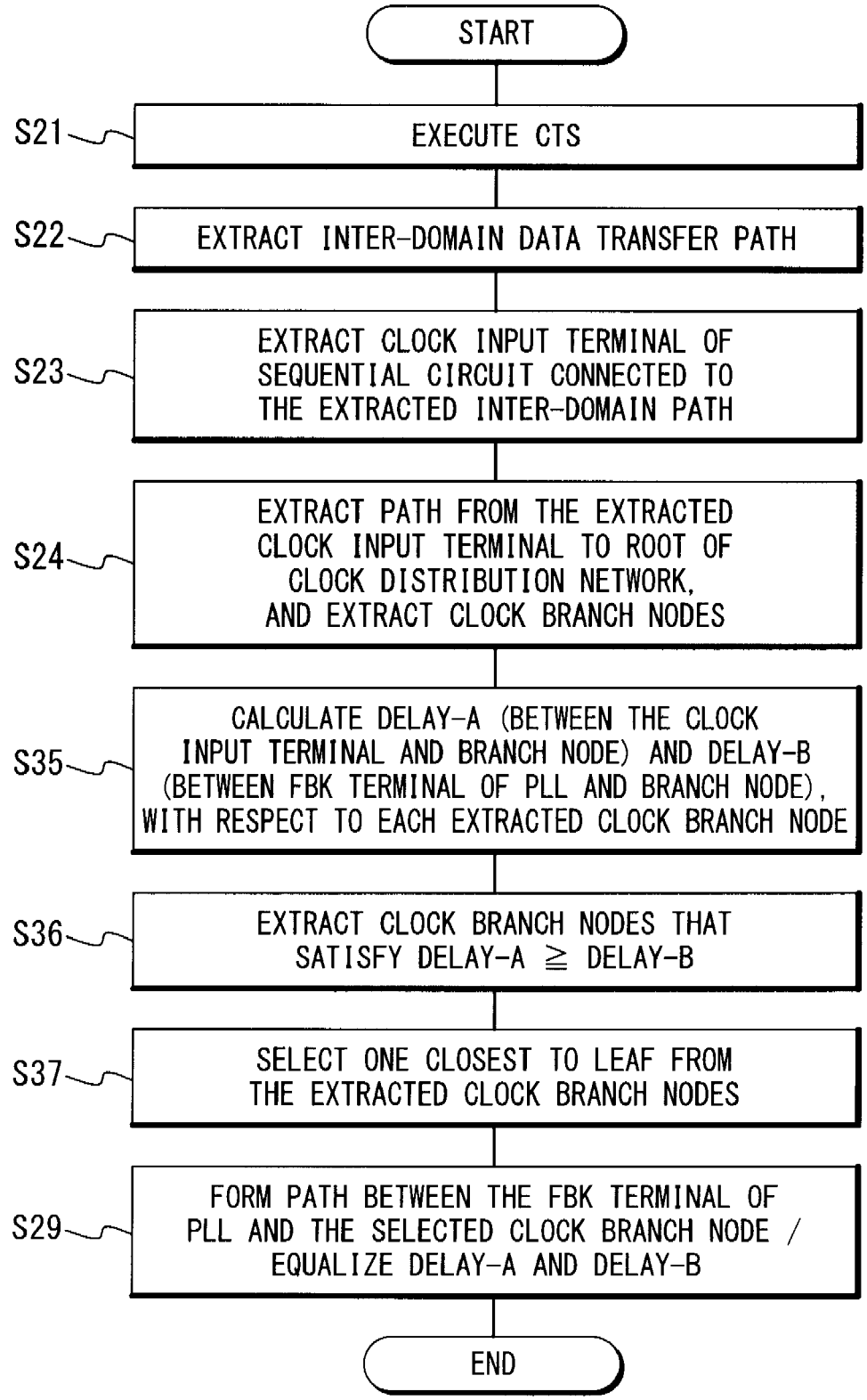
FIG. 6 is a flow chart showing an example of a method of forming a clock distribution circuit according to an embodiment of the present invention.
Figure 7:
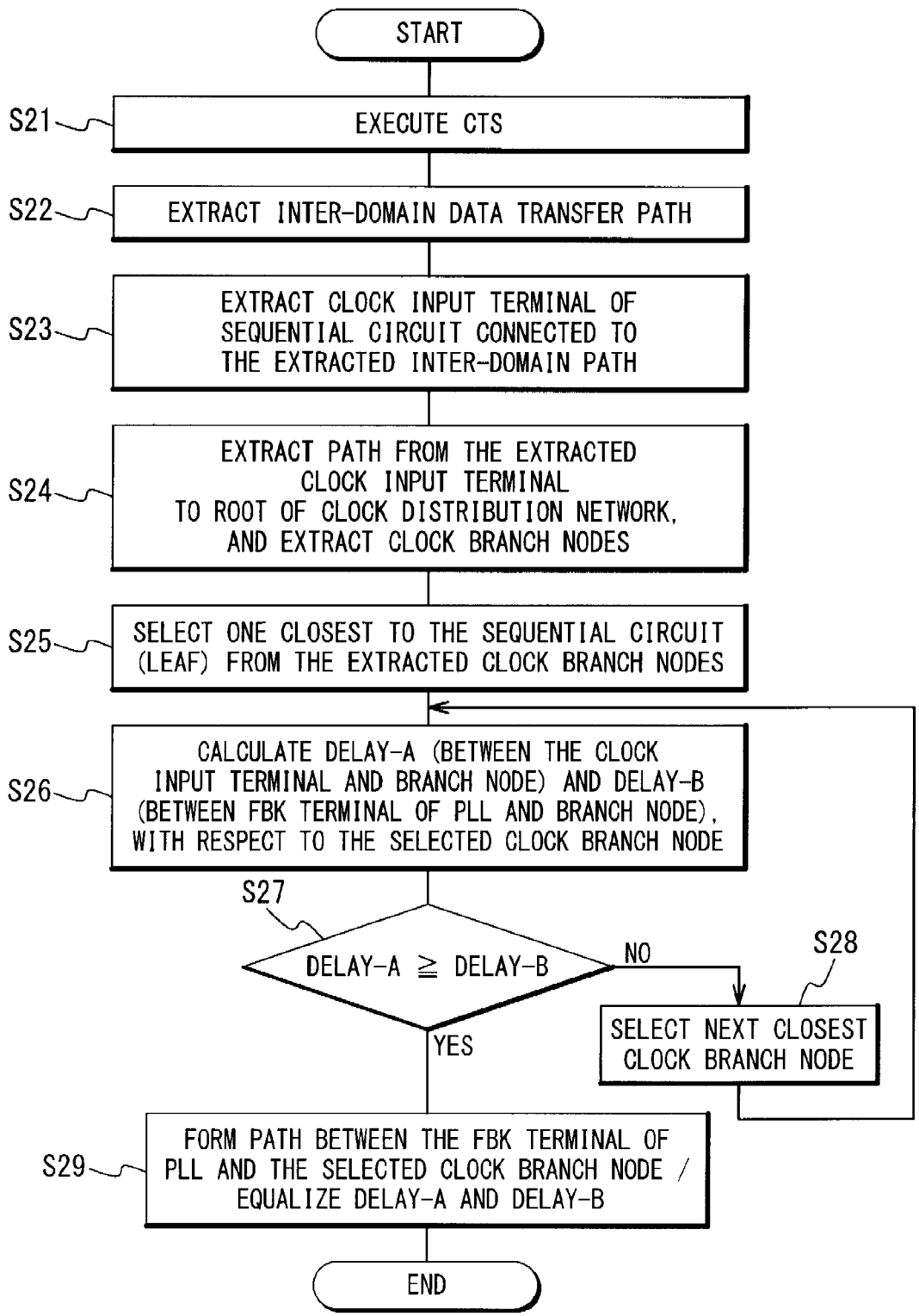
FIG. 7 is a flow chart showing another example of a method of forming a clock distribution circuit according to an embodiment of the present invention.
Figure 8:
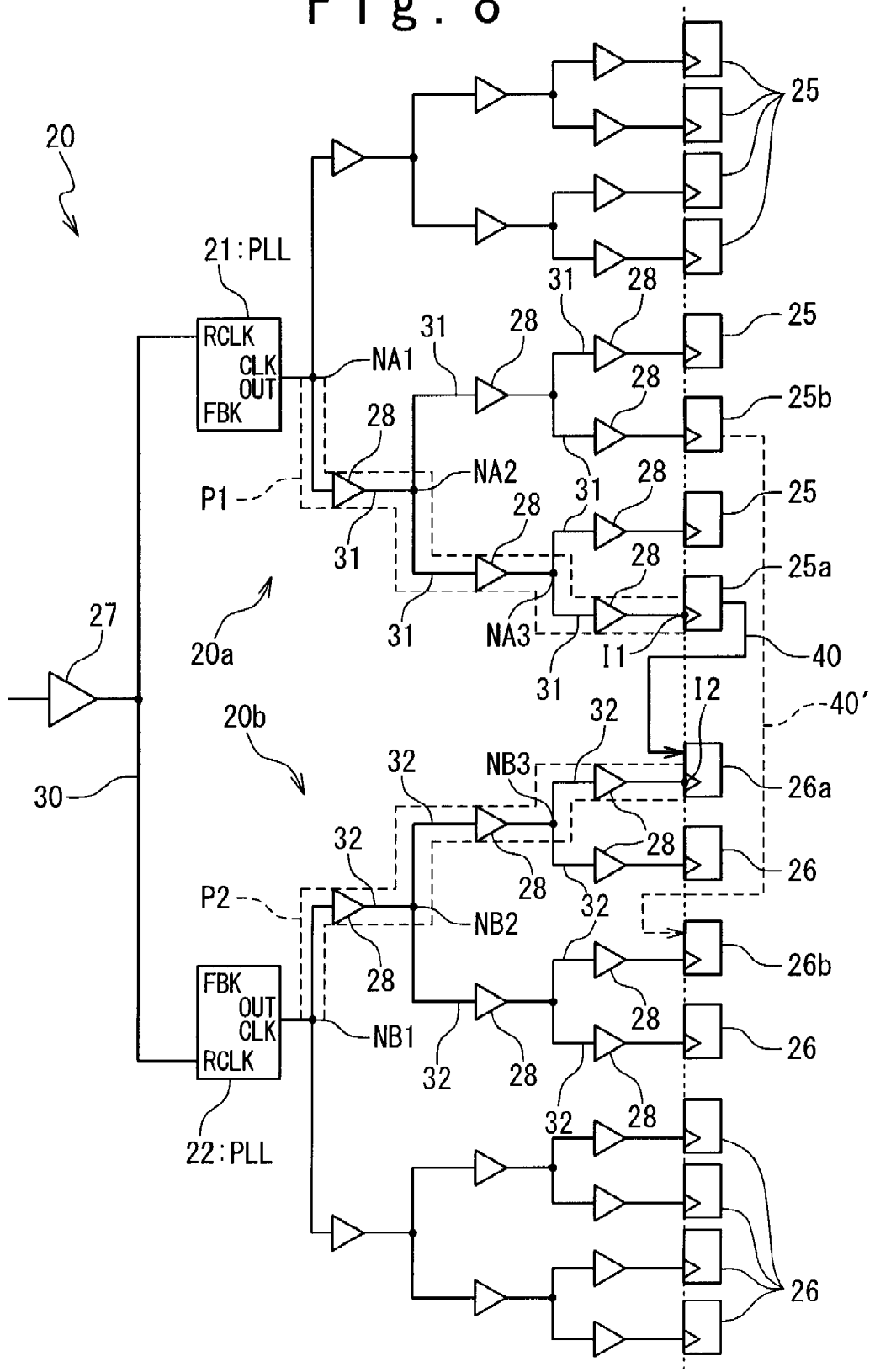
FIG. 8 is a block diagram showing an example of an equivalent circuit of a clock distribution circuit during the method of forming the clock distribution circuit according to the embodiment is performed.

FIG. 6 and FIG. 7 are flow charts showing a first method and a second method of forming the clock distribution circuit according to the embodiments of the present invention. The flow charts show the details of the above-mentioned Step S04 in FIG. 5. The Step S04 is executed in accordance with any of the methods shown in FIG. 6 and FIG. 7. FIG. 8 is a block diagram showing an example of an equivalent circuit of the clock distribution circuit during the method of forming the clock distribution circuit according to the embodiments is performed. It should be noted that any method that can select one inter-domain data transfer path can be applied to the present invention. The methods shown in FIG. 6 and FIG. 7 are merely examples.

In the above-mentioned Step S03, the sequential circuits 25, 25a and 25b, the PLL circuit 21, the sequential circuits 26, 26a and 26b and the PLL circuit 22 are placed by the place-and-route module 60.

In accordance with the CTS method, the CTS module 61 routes the interconnection 31 in a shape of a clock tree between the PLL circuit 21 and the sequential circuits 25, 25a and 25b, and places the clock driver 28 at a position satisfying a predetermined condition on the interconnection 31. As a result, the clock distribution network 20a for distributing the first clock signal of the PLL circuit 21 to the sequential circuits 25, 25a and 25b is formed. Similarly, the CTS module 61 routes the interconnection 32 in a shape of a clock tree between the PLL circuit 22 and the sequential circuits 26, 26a and 26b, and places the clock driver 28 at a position satisfying a predetermined condition on the interconnection 32. As a result, the clock distribution network 20b for distributing the second clock signal of the PLL circuit 22 to the sequential circuits 26, 26a and 26b is formed (Step S21).

Described above is the case where the clock distribution networks 20a and 20b are formed in accordance with the CTS method. However, according to the embodiments, the clock distribution networks may be formed by any other method. For example, the clock distribution network can be simply an H-tree clock distribution network provided in advance. As described above, a tree having the wired connections on the way is also possible, so that the clock distribution networks 20a and 20b have the branch nodes on the clock distribution path.

The data transfer path extraction module 62 extracts the data transfer paths 40 and 40' between the clock distribution network 20a and the clock distribution network 20b. Then, a method of extracting one data transfer path arbitrarily, or a method of extracting the timing critical data transfer path explained in the foregoing first embodiment by further performing the routing with respect to the extracted paths, or a method of extracting the timing critical data transfer path by executing the accurate STA (delay analysis) or the like is performed. As a result, one inter-domain data transfer path is selected from the extracted plurality of inter-domain data transfer paths (Step S22). Here, it is assumed that the data transfer path 40 is selected.

The branch node extraction module 63 extracts the clock input terminal I1 of the transmission-side sequential circuit 25a connected to the extracted data transfer path 40 (Step S23). Then, the branch node extraction module 63 extracts the path P1 from the clock input terminal I1 of the sequential circuit 25a to the PLL circuit 21 of the clock distribution network 20a, and also extracts the clock branch nodes NA2, NA3, ... on the path P1 (Step S24). Similarly, the branch node extraction module 63 extracts the clock input terminal I2 of the reception-side sequential circuit 26a connected to the extracted data transfer path 40 (Step S23). Then, the branch node extraction module 63 extracts the path P2 from the clock input terminal I2 of the sequential circuit 26a to the PLL circuit 22 of the clock distribution network 20b, and also extracts the clock branch nodes NB2, NB3, ... on the path P2 (Step S24).

Next, the first method and the second method of selecting one feedback branch node for the feedback path from the clock branch nodes on each of the paths P1 and P2 extracted in Step S24 will be described below.

Referring to FIG. 6, according to the first method, the following processes are performed with respect to each of the paths P1 and P2. First, the delay (Delay-A) between the clock input terminal I1 of the sequential circuit and each clock branch node and the delay (Delay-B) between the feedback clock terminal FBK of the PLL circuit 21 and each clock branch node are calculated with respect to the clock branch nodes on the path P1 extracted in the Step S24 (Step S35). Based on the Delay-A and Delay-B thus obtained with respect to each clock branch node, clock branch nodes satisfying a relationship that "Delay-A is equal to or larger than Delay-B" are extracted (Step S36). Then, one clock branch node closest to the leaf is selected from the clock branch nodes extracted in the Step S36 (Step S37). The same processes are performed with respect to the path P2. In the example shown in FIG. 2 and FIG. 8, the clock branch nodes NA3 and NB3 are selected with regard to the paths P1 and P2, respectively.

Next, the second method will be described below. Referring to FIG. 7, the branch node selection module 64 selects one clock branch node (NA3 in FIG. 2) closest to the sequential circuit 25a among the extracted clock branch nodes NA2, NA3, ... on the path P1 (Step S25). Subsequently, based on the selected clock branch node NA3, the branch node selection module 64 calculates the Delay-A1 from the clock input terminal I1 of the sequential circuit 25a to the clock branch node NA3 and the Delay-B1 from the feedback clock terminal FBK of the PLL circuit 21 to the clock branch node NA3 (Step S26). Then, the branch node selection module 64 judges whether or not the Delay-A1 is equal to or more than the Delay-B1, based on the calculation result (Step S27). If the Delay-A1 is less than the Delay-B1 (Step S27; NO), the branch node selection module 64 selects the next closest clock branch node NA2 to the sequential circuit 25a from the extracted clock branch nodes NA2, NA3, ... (Step S28), and calculates again the Delay-A1 and the Delay-B1 with respect to the selected clock branch node NA2 (Step S26, Step S27). In this manner, a clock branch node with which the Delay-A1 becomes equal to or more than the Delay-B1 is found. Here, it is assumed that the clock branch node NA3 satisfies the relationship that Delay-A1 is equal to or larger than Delay-B1. Similarly, the branch node selection module 64 selects the clock branch node NB3 closest to the sequential circuit 26a among the extracted clock branch nodes NB2, NB3, ... on the path P2 (Step S25). Subsequently, based on the selected clock branch node NB3, the branch node selection module 64 calculates the Delay-A2 from the clock input terminal I2 of the sequential circuit 26a to the clock branch node NB3 and the Delay-B2 from the feedback clock terminal FBK of the PLL circuit 22 to the clock branch node NB3 (Step S26). Then, the branch node selection module 64 judges whether or not the Delay-A2 is equal to or more than the Delay-B2, based on the calculation result (Step S27). If the Delay-A2 is less than the Delay-B2 (Step S27; NO), the branch node selection module 64 selects the next closest clock branch node NB2 to the sequential circuit 26a from the extracted clock branch nodes NB2, NB3, ... (Step S28), and calculates again the Delay-A2 and the Delay-B2 with respect to the selected clock branch node NB2 (Step S26, Step S27). In this manner, a clock branch node with which the Delay-A2 becomes equal to or more than the Delay-B2 is found. Here, it is assumed that the clock branch node NB3 satisfies the relationship that Delay-A2 is equal to or larger than Delay-B2.

It should be noted that an example where there are only a small number of clock branch nodes (three points for each (NA1, NA2, NA3) and (NB1, NB2, NB3)) is explained above for convenience of description. In an actual circuit, however, a large number of clock branch nodes exist. A clock branch node which satisfies the condition of Step S27 is selected from the large number of clock branch nodes. Is such a clock branch node can not be found, the CTS is executed again by changing condition.

In accordance with the either of the first method or the second method described above, the clock branch node is selected with respect to each of the paths P1 and P2. Then, the following processes are performed with respect to each selected clock branch node.

Since the clock branch node NA3 satisfies the condition Delay-A1≧Delay-B1, the feedback path formation module 65 forms a feedback path (the interconnection 33 in FIG. 2) between the clock branch node NA3 and the feedback clock terminal FBK of the PLL circuit 21. Here, the clock driver 29 is inserted to the interconnection 33 as necessary such that the delay difference between the Delay-A1 and the Delay-B1 becomes within a predetermined allowable range, and preferably the Delay-A1 becomes equal to the Delay-B1 (Step S29). Similarly, since the clock branch node NB3 satisfies the condition Delay-A2 Delay-B2, the feedback path formation module 65 forms a feedback path (the interconnection 34 in FIG. 2) between the clock branch node NB3 and the feedback clock terminal FBK of the PLL circuit 22. Here, the clock driver 29 is inserted to the interconnection 34 as necessary such that the delay difference between the Delay-A2 and the Delay-B2 becomes within a predetermined allowable range, and preferably the Delay-A2 becomes equal to the Delay-B2 (Step S29).

In this manner, the clock distribution circuit 20 which can distribute the clock signal without being influenced by the OCV is formed, even when there is a data transfer path which connects between sequential circuits belonging to different clock distribution networks.

If there is no data transfer path which links between sequential circuits connected to different clock distribution networks in the Step S22, the feedback path is set in accordance with a conventional method (not explained here) and the clock distribution circuit 20 is formed.

Based on the mask data of the semiconductor integrated circuit generated by the above-described method of designing the semiconductor integrated circuit, the semiconductor integrated circuit of the present invention is manufactured. In other words, the Steps S01 to S14 including the above-explained first and second method are first executed and thus the mask data is generated. Next, a mask is made in accordance with the generated mask data. The method of making the mask is not specifically limited. Any method known to the general public can be employed. After that, the semiconductor integrated circuit 45 (see FIG. 3) is manufactured on a semiconductor substrate by using the created mask. The manufacturing processes of the semiconductor integrated circuit 45 are not specifically limited, as log as the created mask is used. For example, a film formation process, a lithography process and so on, which are known to the general public, can be employed.

By performing the method of designing the semiconductor integrated circuit using the method of forming the clock distribution circuit according to the present embodiments, the semiconductor integrated circuit 45 including the clock distribution circuit 20 of the present embodiments can be manufactured. In this case, it is possible to distribute the clock signal without influenced by the OCV, even when there is a data transfer path connecting between circuits that belong to different clock distribution networks (clock domains). Therefore, the data transfer between the circuits can be performed accurately.

In the above description of the method, the processing from the placement to the tape-out is explained. A method of forming a clock distribution circuit of a semiconductor device (semiconductor chip) according to the present invention can be described as follows.

The method of forming a clock distribution circuit includes: (a) placing a first sequential circuit operating in accordance with a first clock signal, a second sequential circuit operating in accordance with a second clock signal, a first PLL circuit and a second PLL circuit in a placement-and-routing region of the semiconductor device, based on a netlist, a functional block data and a design rule data; (b) forming a first clock distribution network and a second clock distribution network, wherein the first clock distribution network distributes the first clock signal output by the first PLL circuit to the first sequential circuit and the second clock distribution network distributes the second clock signal output by the second PLL circuit to the second sequential circuit; and (c) selecting a first branch node, which is different from a branch node closest to the first PLL circuit, from a plurality of branch nodes included in a clock distribution path from the first PLL circuit to the first sequential circuit on the first clock distribution network, and forming a feedback path from the selected first branch node to the first PLL circuit, when a first data transfer path connecting between the first sequential circuit and the second sequential circuit exists.

It is apparent that the present invention is not limited to the above embodiments and may be modified and changed without departing from the scope and spirit of the invention.

What is claimed is:

1. A clock distribution circuit in a semiconductor integrated circuit that has a first sequential circuit which operates in accordance with a first clock signal distributed through a first branch node on a first clock distribution network, a second sequential circuit which operates in accordance with a second clock signal distributed through a second branch node on a second clock distribution network, and a data transfer path provided between said first sequential circuit and said second sequential circuit, comprising:
a first PLL circuit configured to receive a first feedback clock signal that is said first clock signal branched at said first branch node, and to output said first clock signal to said first clock distribution network based on said first feedback clock signal and a first reference clock signal; and
a second PLL circuit configured to receive a second feedback clock signal that is said second clock signal branched at said second branch node, and to output said second clock signal to said second clock distribution network based on said second feedback clock signal and a second reference clock signal,
wherein a branch node is provided at least one of between an output of said first PLL circuit and said first branch node on said first clock distribution network and between an output of said second PLL circuit and said second branch node on said second clock distribution network,
wherein said first branch node is closest to said first sequential circuit among a plurality of branch nodes on a first path from said first PLL circuit to said first sequential circuit.

2. The clock distribution circuit according to claim 1, wherein said second branch node is closest to said second sequential circuit among a plurality of branch nodes on a second path from said second PLL circuit to said second sequential circuit.

3. The clock distribution circuit according to claim 1, wherein a reference clock signal input from an outside through a clock input buffer is supplied as said first reference clock signal and said second reference clock signal to said first PLL circuit and said second PLL circuit, respectively.

4. The clock distribution circuit according to claim 1, wherein said first reference clock signal is supplied from an outside to said first PLL circuit through a first clock input buffer, and said second reference clock signal is supplied from an outside to said second PLL circuit through a second clock input buffer.

5. The clock distribution circuit according to claim 1, wherein a delay of said first clock signal from said first branch node to said first sequential circuit is equal to a delay of said first clock signal from said first branch node to said first PLL circuit, and a delay of said second clock signal from said second branch node to said second sequential circuit is equal to a delay of said second clock signal from said second branch node to said second PLL circuit.

6. The clock distribution circuit according to claim 3, further comprising:
a first buffer provided on a feedback path of said first clock signal from said first branch node to said first PLL circuit, a delay of said first buffer being equal to that of said clock input buffer; and
a second buffer provided on a feedback path of said second clock signal from said second branch node to said second PLL circuit, a delay of said second buffer being equal to that of said clock input buffer.

7. The clock distribution circuit according to claim 4, further comprising:
a first buffer provided on a feedback path of said first clock signal from said first branch node to said first PLL circuit, a delay of said first buffer being equal to that of said first clock input buffer; and
a second buffer provided on a feedback path of said second clock signal from said second branch node to said second PLL circuit, a delay of said second buffer being equal to that of said second clock input buffer.

8. A semiconductor integrated circuit comprising said clock distribution circuit according to claim 1.

9. A clock distribution circuit in a semiconductor integrated circuit, the semiconductor integrated circuit comprising:
a first sequential circuit which operates in accordance with a first clock signal distributed through a first branch node on a first clock distribution network;
a second sequential circuit which operates in accordance with a second clock signal distributed through a second branch node on a second clock distribution network; and
a data transfer path provided between said first sequential circuit and said second sequential circuit,
the clock distribution circuit comprising:
a first PLL circuit configured to receive a first feedback clock signal from said first branch node, and to output said first clock signal to said first clock distribution network based on said first feedback clock signal and a first reference clock signal; and
a second PLL circuit configured to receive a second feedback clock signal from said second branch node, and to output said second clock signal to said second clock distribution network based on said second feedback clock signal and a second reference clock signal,
wherein at least a third branch node is provided between an output of said first PLL circuit and said first branch node on said first clock distribution network, and at least a fourth branch node is provided between an output of said second PLL circuit and said second branch node on said second clock distribution network.

* * * * *

UNITED STATES PATENT AND TRADEMARK OFFICE
CERTIFICATE OF CORRECTION

PATENT NO. : 7,809,971 B2  Page 1 of 1
APPLICATION NO. : 11/760889
DATED : October 5, 2010
INVENTOR(S) : Masayuki Shimobeppu It is certified that error appears in the above-identified patent and that said Letters Patent is hereby corrected as shown below:

In the Specifications:

Column 15, Line 19: Delete "Delay-A2" and insert -- Delay-A2 $\geq$ --

Signed and Sealed this

Twenty-first Day of December, 2010

David J. Kappos
*Director of the United States Patent and Trademark Office*